US010280656B2

(12) United States Patent
Nagata et al.

(10) Patent No.: US 10,280,656 B2
(45) Date of Patent: May 7, 2019

(54) DOOR HANDLE APPARATUS FOR VEHICLE

(71) Applicant: AISIN SEIKI KABUSHIKI KAISHA, Kariya-shi (JP)

(72) Inventors: Koichi Nagata, Chiryu (JP); Mizuya Sakamoto, Kariya (JP); Nobukazu Araki, Hekinan (JP); Katsuhiro Sato, Takahama (JP); Kota Uetake, Aichi-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/513,470

(22) PCT Filed: Sep. 24, 2015

(86) PCT No.: PCT/JP2015/076864
§ 371 (c)(1),
(2) Date: Mar. 22, 2017

(87) PCT Pub. No.: WO2016/052286
PCT Pub. Date: Apr. 7, 2016

(65) Prior Publication Data
US 2017/0298660 A1    Oct. 19, 2017

(30) Foreign Application Priority Data
Sep. 30, 2014   (JP) .................................. 2014-201013

(51) Int. Cl.
*E05B 77/34*       (2014.01)
*E05B 79/04*       (2014.01)
(Continued)

(52) U.S. Cl.
CPC ................ *E05B 79/04* (2013.01); *B60J 5/04* (2013.01); *E05B 77/34* (2013.01); *E05B 79/06* (2013.01);
(Continued)

(58) Field of Classification Search
CPC .......... E05B 79/04; E05B 85/16; E05B 77/34; E05B 79/02
See application file for complete search history.

(56) References Cited

U.S. PATENT DOCUMENTS 7,794,273 B2 *   9/2010   Xu ......................... H01R 12/59
                                                        411/45
8,974,165 B2 *   3/2015   Yumi .................... F16B 33/006
                                                        411/424
(Continued)

FOREIGN PATENT DOCUMENTS

EP      2 559 832 A1    2/2013
JP      2605319 Y2      7/2000
(Continued)

OTHER PUBLICATIONS

International Search Report dated Nov. 17, 2015 in PCT/JP2015/076864 filed Sep. 24, 2015.

*Primary Examiner* — Kristina R Fulton
*Assistant Examiner* — Thomas L Neubauer
(74) *Attorney, Agent, or Firm* — Oblon, McClelland, Maier & Neustadt, L.L.P.

(57) ABSTRACT

A door handle apparatus for a vehicle includes an outside handle configured by a first handle member and a second handle member which are integrally fixed to each other via a fixing mechanism configured by a plurality of engagement tabs, a pedestal portion and a stopper member, the engagement tabs being provided at one of the first handle member and the second handle member, and arranged to be separated from each other by a space portion which is predetermined and to face each other, the pedestal portion being provided at the other of the first handle member and the second handle member, and including an engagement hole into which the engagement tabs are insertable, and the stopper member being inserted in the space portion between the plurality of (Continued)

engagement tabs which is in a state of being inserted in the engagement hole of the pedestal portion.

5 Claims, 12 Drawing Sheets

(51) Int. Cl.
*E05B 85/16* (2014.01)
*B60J 5/04* (2006.01)
*E05B 79/06* (2014.01)
*F16B 5/12* (2006.01)
*F16B 37/00* (2006.01)
*E05B 79/02* (2014.01)
*F16B 19/10* (2006.01)
*F16B 25/00* (2006.01)

(52) U.S. Cl.
CPC .............. *E05B 85/16* (2013.01); *F16B 5/128* (2013.01); *F16B 37/005* (2013.01); *E05B 79/02* (2013.01); *F16B 5/126* (2013.01); *F16B 19/1081* (2013.01); *F16B 25/0015* (2013.01)

(56) References Cited

U.S. PATENT DOCUMENTS

| 2012/0019014 A1 | 1/2012 | Tateishi et al. |
| 2014/0203574 A1* | 7/2014 | Noda ...................... E05B 81/77 292/336.3 |

FOREIGN PATENT DOCUMENTS

| JP | 3762227 B2 | 4/2006 |
| JP | 2012-26205 A | 2/2012 |
| WO | WO 2012/151403 A1 | 11/2012 |

* cited by examiner

FIG. 6
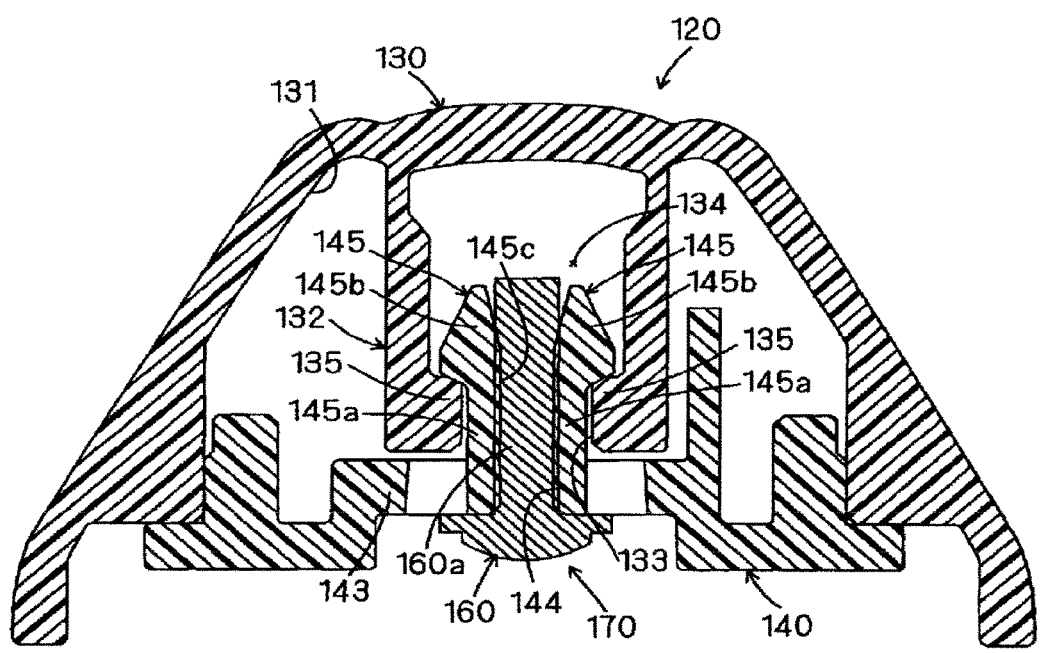
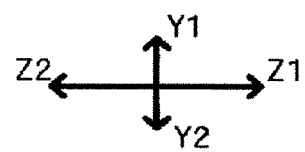

FIG. 7
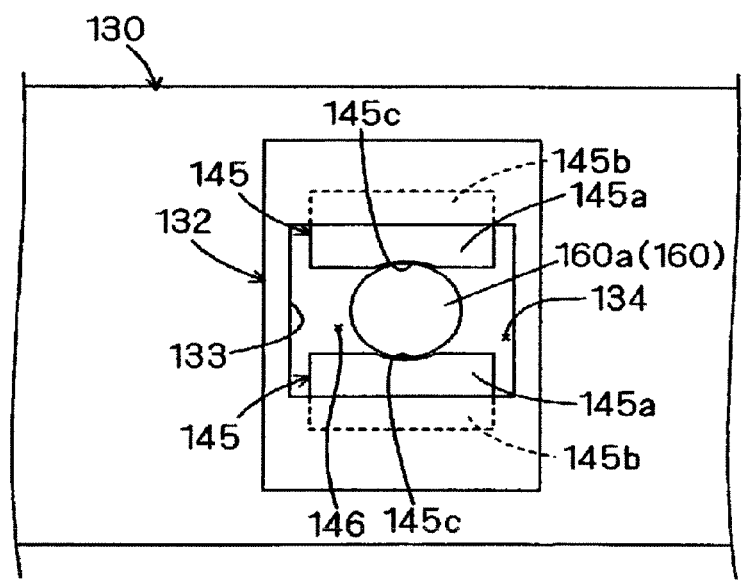
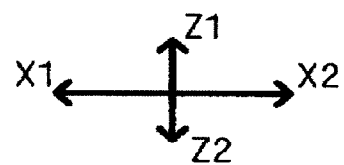

FIG. 10
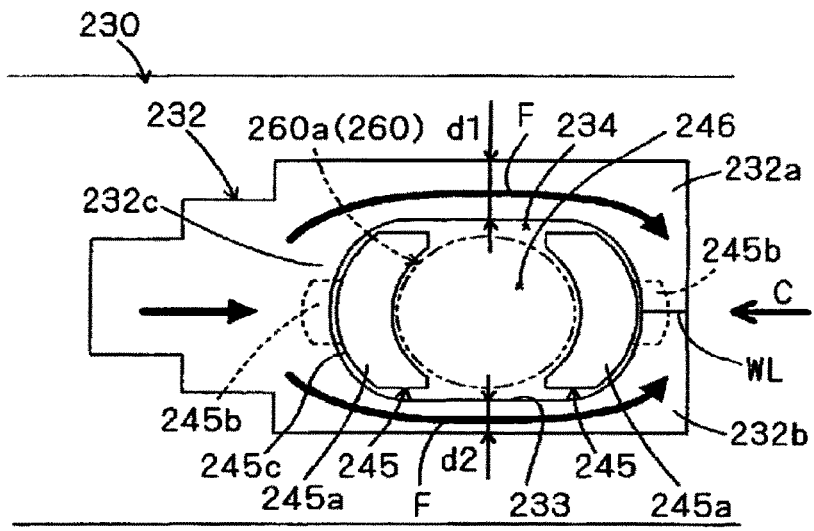
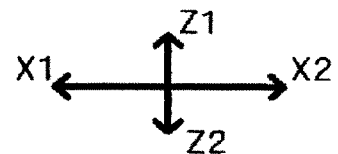
FIG. 11
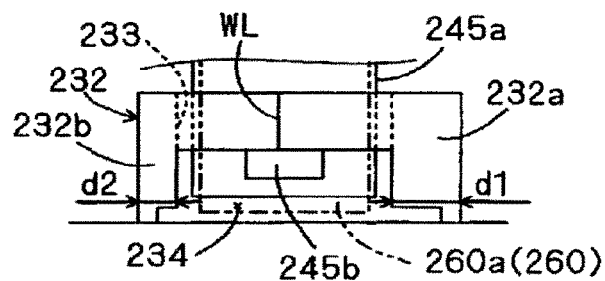
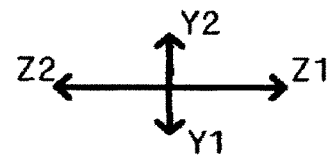

FIG. 13
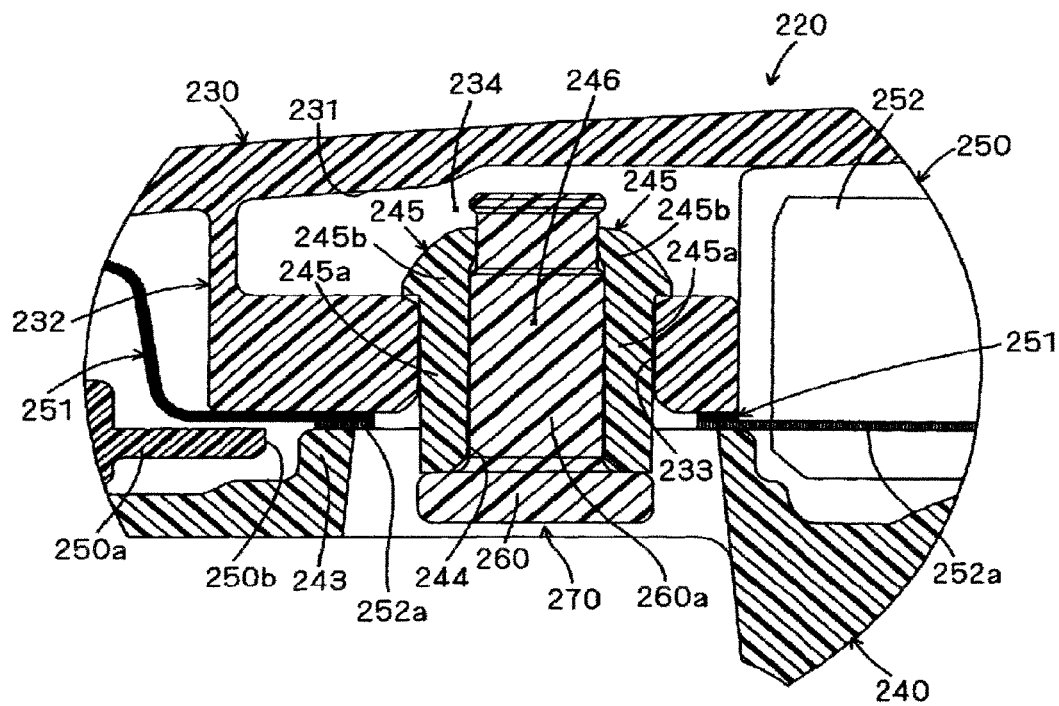
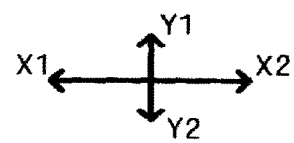

DOOR HANDLE APPARATUS FOR VEHICLE

TECHNICAL FIELD

The present invention relates to a door handle apparatus for a vehicle, which is attached to a vehicle door.

BACKGROUND ART

The following Patent reference 1 discloses an example of a door handle apparatus for a vehicle of this kind (which will be hereinafter also referred to as "a door handle apparatus"). The door handle apparatus includes a base frame assembled, from a vehicle inner side, to a door outer panel configuring an outer surface of a vehicle door. The door handle apparatus includes an outside handle made of resin which is assembled, from a vehicle outer side of the door outer panel, on the base frame. The outside handle includes a so-called "two-piece structure" in which two handle members made of resin are integrally fixed to each other. In this case, a first fixing mechanism is known in which a metal nut member is attached by welding and/or insert-molding to a boss portion of one of the handle members which is at the vehicle outer side, and a metal bolt member is inserted in an insertion hole of the other of the handle members which is at the vehicle inner side, and the two handle members are fixed to each other by threadedly engaging the metal bolt member with the metal nut member. As another structure, a second fixing mechanism is known in which the metal bolt member (a screw, a self-tapping screw, for example) inserted in the insertion hole of the other of the handle members which is arranged at the vehicle inner side is inserted directly into the boss portion of the one of the handle members which is arranged at the vehicle outer side, and thus the two handle members are fixed to each other.

DOCUMENT OF PRIOR ART

Patent Document

Patent document 1: JP2012-26205A

OVERVIEW OF INVENTION

Problem to be Solved by the Invention

At the outside handle of the door handle apparatus of this kind, the nut member is required in a case where the above-described first fixing mechanism is used to fix the two metal handle members to each other. Accordingly, a cost of the nut member itself and/or workload for attaching the nut member are needed, and thus the fixing mechanism becomes a factor in a cost increase of a product. In addition, in a case where the above-described second fixing mechanism is used, a crack may occur to the boss portion of the one of the handle members when the bolt member is screwed in. In such a case, there might occur a problem that the two resin handle members cannot be fixed to each other reliably. In particular, in a case where a polycarbonate resin material (amorphous resin), which is suitable for paintwork and/or plating, is used as the resin material of the one of the handle members, the above-described problem is more remarkable because the polycarbonate resin material is a material which is easily cracked under an action of stress.

The present invention is made in consideration of the above-described aspect, and one of purposes thereof is to provide a technique which is effective to achieve at low cost a fixing mechanism fixing two resin-made handle members integrally to each other at an outside handle of a door handle apparatus for a vehicle, the outside handle which includes a two-piece structure.

(Means for solving the problem) To achieve the aforementioned purpose, a door handle apparatus for a vehicle related to the present invention includes a base frame and an outside handle. The base frame is configured to be provided at a vehicle inner side of a door outer panel configuring an outer surface of a vehicle door. The outside handle is configured by a first handle member made of resin and a second handle member made of resin which are integrally fixed to each other via a fixing mechanism, the second handle member being at the vehicle inner side relative to the first handle member, and the outside handle is configured to be attached to the base frame from a vehicle outer side of the door outer panel. That is, the outside handle includes a two-piece structure formed of the two handle members made of resin. The fixing mechanism is configured by plural engagement tabs, a pedestal portion and a stopper member. The plural engagement tabs are provided at one handle member that is one of the first handle member and the second handle member, and arranged to be separated from each other by a space portion which is predetermined and to face each other. The pedestal portion is provided at the other handle member that is the other of the first handle member and the second handle member, and includes an engagement hole into which the plural engagement tabs are insertable. The stopper member is inserted in the space portion between the plural engagement tabs which are in a state of being inserted in the engagement hole of the pedestal portion. In this case, the stopper member restricts the plural engagement tabs which are in the state of being inserted in the engagement hole of the pedestal portion from elastically deforming in a disengaging direction, and thus a fixed state of the two handle members is maintained.

According to the above-described configuration, to fix the two handle members both of which are made of the resin to each other, simply the stopper member may be prepared in addition to the two handle members. Therefore, compared to a case where a fixing mechanism is employed in which a metal bolt member inserted in an insertion hole of the second handle member is threadedly engaged with a metal nut member attached to the first handle member by welding and/or insert-molding, the number of parts and components can be reduced. In this case, workload for attaching the nut member is not needed. As a result, the cost required by the fixing mechanism for fixing the two handle members can be kept low.

At the above-described door handle apparatus for the vehicle, it is ideal that the fixing mechanism is configured in such a manner that the plural engagement tabs engage with the engagement hole of the pedestal portion provided at the first handle member, the plural engagement tabs are extended from the second handle member serving as the one handle member towards the first handle member serving as the other handle member. In addition, it is ideal that the stopper member is configured as a screw member made of metal, the screw member is inserted into the space portion by being screwed into the space portion that is formed between the plural engagement tabs which are in a state of being inserted in the engagement hole of the pedestal portion. According to the fixing mechanism, the screw member is screwed into the second handle member at the vehicle inner side. Accordingly, there is no need that the screw member is screwed into the first handle member at the vehicle outer side which is generally formed of resin material which is suitable for paintwork and/or plating (typically, a polycarbonate resin material (amorphous resin)). As a result, even in a case where the polycarbonate system resin material is used in the first handle member, the two handle members are reliably fixed to each other without the concern about a problem, including a crack, for example.

At the above-described door handle apparatus for the vehicle, it is ideal that the fixing mechanism is configured in such a manner that the plural engagement tabs engage with the engagement hole of the pedestal portion provided at the first handle member, the plural engagement tabs being extended from the second handle member serving as the one handle member towards the first handle member serving as the other handle member. In addition, it is ideal that the stopper member is configured as a pin made of resin, the pin is inserted into the space portion that is formed between the plural engagement tabs which are in a state of being inserted in the engagement hole of the pedestal portion. According to the fixing mechanism, by using the pin that is made of resin and is relatively inexpensive, a component cost of the stopper member can be kept low.

At the above-described door handle apparatus for the vehicle, it is ideal that the pedestal portion includes a pair of standing walls formed to be parallel to each other and to stand from the first handle member towards the second handle member, and a connection wall connecting the pair of standing walls to each other and including the engagement hole between the pair of standing walls, and it is ideal that the plural engagement tabs which are in a state of being inserted in the engagement hole is accommodated in a facing space portion at which the pair of standing walls face each other. According to the pedestal portion, the plural engagement tabs which are accommodated in the facing space portion in a state of being inserted in the engagement hole are protected by the pair of standing walls, and thus a load for disengagement can be prevented from acting on the plural engagement tabs.

At the above-described door handle apparatus for the vehicle, it is ideal that the pedestal portion is formed to extend along a resin flow direction in which molten resin flows when the pair of standing walls is being resin molded, and it is ideal that a wall thickness of one of the pair of standing walls in a direction intersecting with the resin flow direction and a wall thickness of the other of the pair of standing walls in a direction intersecting with the resin flow direction differ from each other. Here, in a case where the engagement hole is provide at the connection wall of the pedestal portion, during the resin molding, flow of the molten resin is divided and flows in a branched manner at a protruding portion of a metal mold which corresponds to the engagement hole. Thereafter, the divided flows of the molten resin join together again at an intermediate portion between the two standing walls and are fused, and form a thin line (a weld line) at a portion at which the molten resin is fused. It is known that the portion at which the weld line is formed is weak in adhesion strength and is easily cracked. Thus, a position of the weld line can be deviated from the intermediate position of the two standing walls towards either one of the standing walls by making a wall thickness of one of the standing walls and a wall thickness of the other of the standing walls differ from each other, that is, by making a flow speed of the molten resin flowing at a portion of the metal mold, the portion which corresponds to the one of the standing walls, and a flow speed of the molten resin flowing at a portion of the metal mold, the portion which corresponds to the other of the standing walls, from each other at the resin-molding. As a result, the weld line is formed at a position (a position close to either one of the standing walls) at which the strength is higher than the intermediate portion, and accordingly the pedestal portion is not easily cracked.

Effect of the Invention

As described above, according to the present invention, at the outside handle of the door handle apparatus for the vehicle, which includes the two-piece structure, it is possible to achieve at low cost the fixing mechanism fixing the two resin handle members integrally with each other.

BRIEF DESCRIPTION OF DRAWINGS

FIG. 6 is a cross-sectional view of the outside handle 120 which is taken along line B-B of FIG. 5.

FIG. 7 is a schematic view of a structure of a pedestal portion 132 of the first handle member 130 of FIG. 2.

FIG. 10 is a plane view schematically illustrating a structure of the pedestal portion 232 of the first handle member 230 of FIG. 9.

FIG. 11 is a view of the pedestal portion 232 of FIG. 10, which is seen from a direction of an arrow C.

FIG. 13 is a cross-sectional view illustrating a fixing mechanism 270 of the outside handle 220.

MODE FOR CARRYING OUT THE INVENTION

Figure 1:
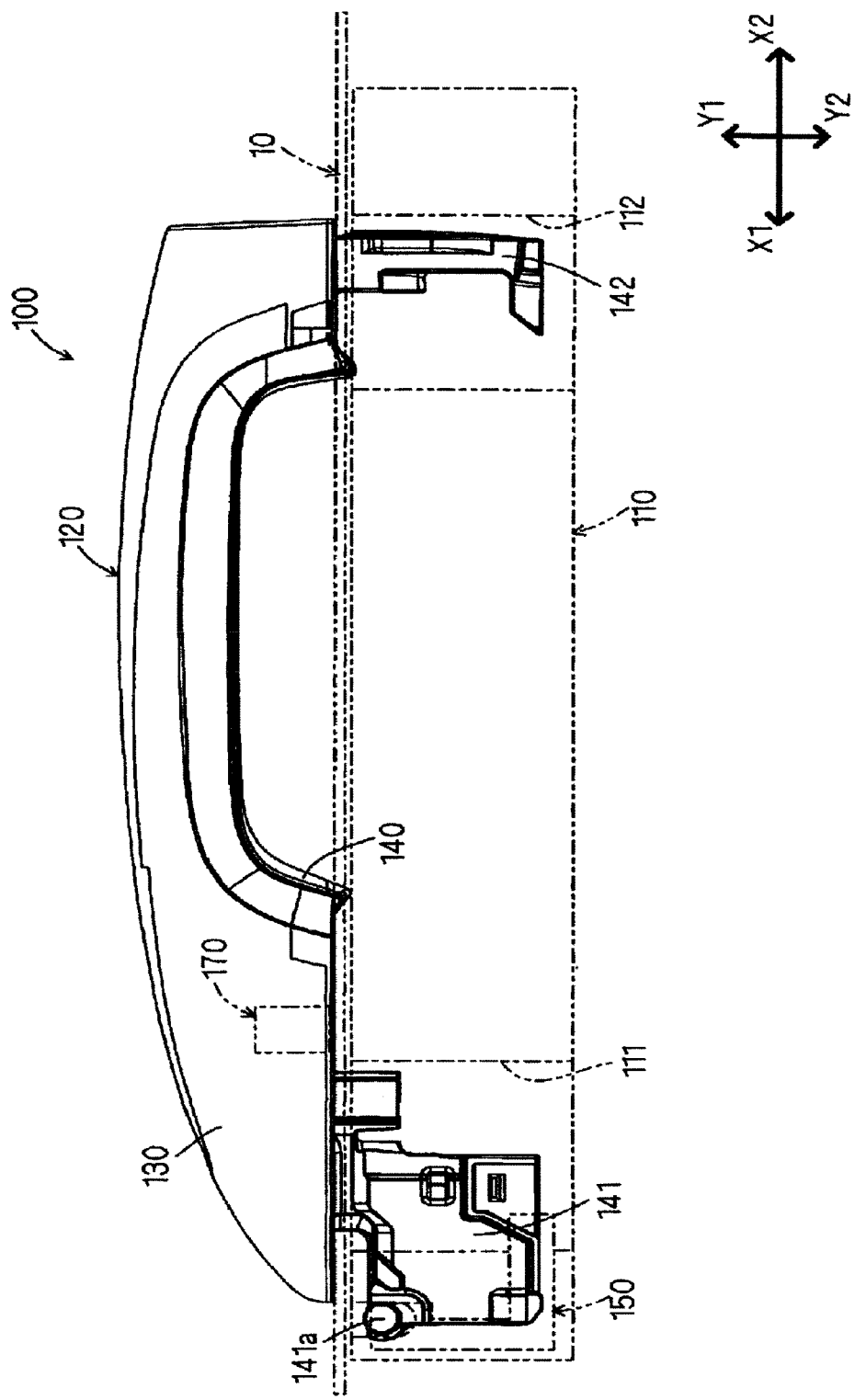
FIG. 1 is a side view of an outside handle 120 of a first embodiment, which configures a door handle apparatus 100 for a vehicle.

A first embodiment and a second embodiment of the present invention will be described hereunder with reference to the drawings. In the drawings, a vehicle front side and a vehicle rear side are indicated with an arrow X1 and an arrow X2, respectively. A vehicle outer side and a vehicle inner side are indicated with an arrow Y1 and an arrow Y2, respectively. A vehicle upper side and a vehicle lower side are indicated with an arrow Z1 and an arrow Z2, respectively. These directions can be applied to a door handle apparatus for a vehicle in a state before the door handle apparatus is mounted on a vehicle door, and to the door handle apparatus for the vehicle in a state after the door handle apparatus is mounted on the vehicle door.

First Embodiment

A door handle apparatus 100 for a vehicle (which will be simply referred to also as "a door handle apparatus") illustrated in FIG. 1 is to be assembled on a vehicle door. The door handle apparatus 100 is configured as an assembly (which will be simply referred to also as "an assy") that corresponds to plural parts and components integrally assembled to one another, including a base frame 110, an outside handle 120 and a bearing member 150.

The base frame 110 is a member formed in an elongated shape extended along the vehicle front and rear direction X1, X2. The base frame 110 is provided at a vehicle inner side of a door outer panel 10 which is made of metal and configures an outer surface of the vehicle door. The base frame 110 engages with the outside handle 120, thereby performing a function of holding the outside handle 120. The base frame 110 serves as "a base frame" of the present invention. At a portion of a front end side (the left side in FIG. 1) of the base frame 110, an opening portion 111 is formed to open. At a portion of a rear end side (the right side in FIG. 1) of the base frame 110, an opening portion 112 is formed to open The outside handle (which will be simply referred to also as "a handle") 120 of the first embodiment is a grip-type handle portion extended in an elongated shape along the vehicle front and rear direction X1, X2 similarly to the base frame 110, and including one end and the other end. The outside handle 120 is made from a resin material. The outside handle 120 serves as "an outside handle" of the present invention. A user can perform an opening and closing operations of the vehicle door by gripping the handle 120 with his/her fingers. The outside handle 120 includes a so-called "two-piece structure". In the two-piece structure, in a state where the outside handle 120 is attached to the door outer panel 10, two members, that is, a first handle member (which will be simply referred to also as "an upper member") 130 made of resin and arranged at the vehicle outer side (the upper side in FIG. 1) and a second handle member (which will be simply referred to also as "a lower member") 140 made of resin and arranged at the vehicle inner side (the lower side in FIG. 1) relative to the first handle member 130 are integrally fixed to each other via a predetermined fixing mechanism 170 (which will be simply referred to also as "a fixing mechanism"). The first handle member 130 and the second handle member 140 serve as "the first handle member" and "the second handle member" of the present invention, respectively.

The handle 120 protrudes from the vehicle outer side towards the vehicle inner side via an opening (not shown) formed to open at the door outer panel 10 and via the opening portions 111 and 112 of the base frame 110. At this protruding portion, the handle 120 is attached to the base frame 110. An engagement arm 141 is provided at a portion of a handle front end side (a portion of one end side) of the second handle member 140 of the handle 120. The engagement arm 141 is inserted in the opening portion 111 of the base frame 110. The engagement arm 141 includes a handle shaft portion 141a formed in a columnar shape and extended in a vehicle upper and lower direction. At the handle shaft portion 141a, the engagement arm 141 is rotatably attached to the bearing member 150 integrally assembled on the base frame 110. That is, the handle shaft portion 141a serves as a handle rotational center of the handle 120. On the other hand, an engagement leg portion 142 is provided at a portion of a handle rear end side (a portion of the other end side) of the second handle member 140 of the handle 120. The engagement leg portion 142 includes a substantially L-shaped cross section and is inserted in the opening portion 112 of the base frame 110. The engagement leg portion 142 functions as a handle stopper defining the maximum rotational position (a full stroke position) of the handle 120 when the opening operation of the handle 120 is performed.

Figure 2:
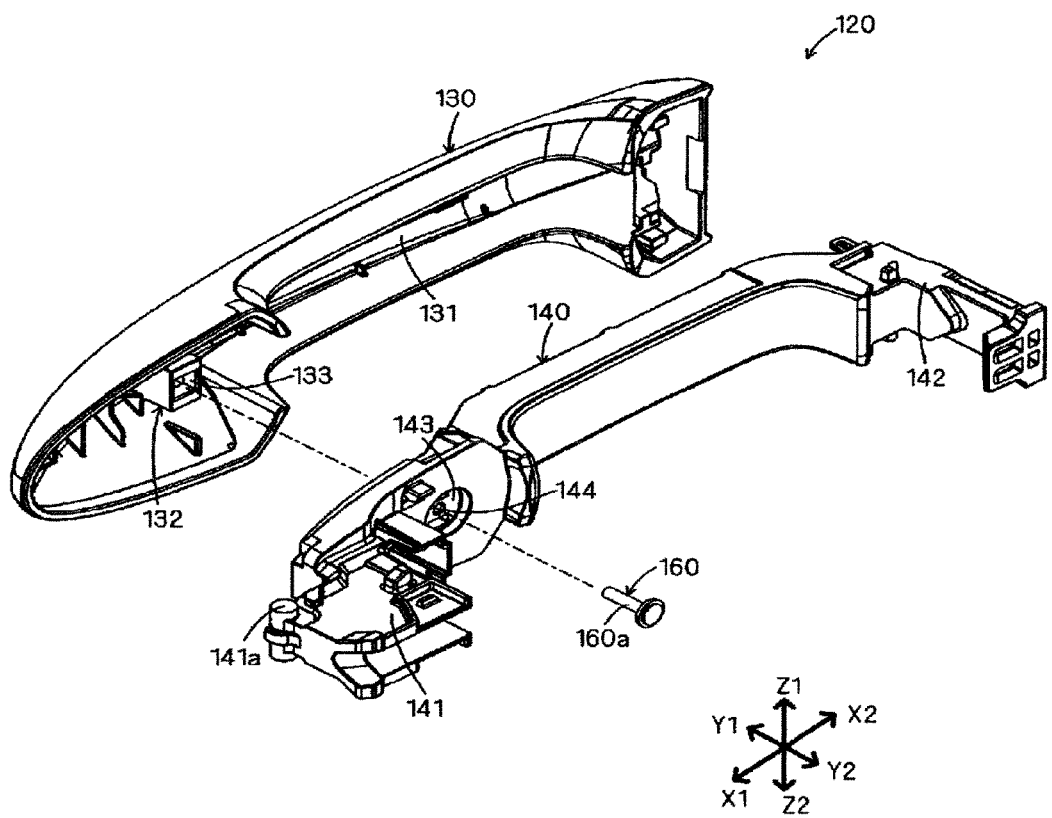
FIG. 2 is an exploded perspective view of the outside handle 120.
Figure 3:
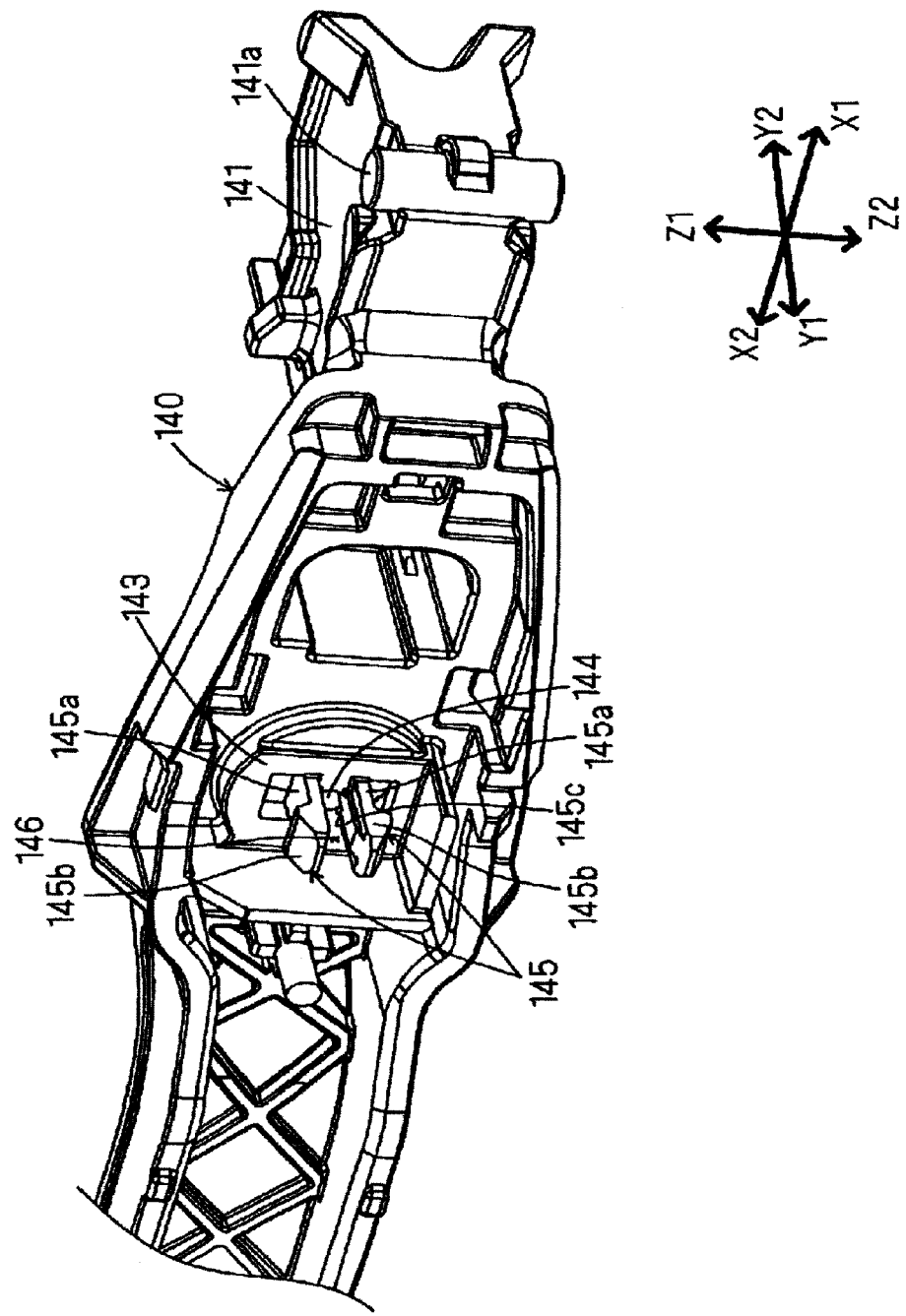
FIG. 3 is a perspective view illustrating configurations of engagement tabs 145 and 145 of a second handle member 140.

As FIGS. 2 and 3 are referred to, the fixing mechanism 170 is configured by a pedestal portion 132, a pair of engagement tabs 145 and 145, and a self-taping screw (which will be simply referred to also as "a screw") 160. The pedestal portion 132 is provided at the first handle member 130 so as to protrude from an inner wall surface 131 of the first handle member 130 towards the second handle member 140. The pair of engagement tabs 145 and 145 is formed to extend from a boss portion 143 of the second handle member 140 towards the pedestal portion 132. The fixing mechanism 170 serves as "the fixing mechanism" of the present invention.

The pedestal portion 132 is formed in a configuration (which will be simply referred to also as "a shape of a box") including an engagement hole 133 formed to open so that the pair of engagement tabs 145 and 145 is engageable with (insertable into) the engagement hole 133, and including a facing space portion (which will be simply referred to also as "an accommodation space portion") 134 at which a pair of standing walls face each other. The facing space portion 134 is for accommodating distal end portions of the pair of engagement tabs 145 and 145 that is in an engaged state (an inserted state) in which the engagement tabs 145 and 145 are engaged with the engagement hole 133. In the facing space portion 134. The pedestal portion 132 serves as "the pedestal portion" of the present invention. In addition, the engagement hole 133 of the pedestal portion 132 is a portion which includes a recessed shape and engages with the pair of engagement tabs 145 and 145 arranged at a side of the second handle member 140. The engagement hole 133 serves as "the engagement hole" of the present invention.

The engagement tabs 145 and 145 are arranged as a pair to face each other and to be separated from each other by a predetermined space portion 146 interposed therebetween in the vehicle upper and lower direction Z1, Z2. A male threaded portion 160a of the screw 160 is insertable into the space portion 146 that is predetermined. At the second handle member 140 in an initial state illustrated in FIG. 3, the pair of engagement tabs 145 and 145 extends in parallel with the vehicle outer side Y1 from an edge portion of a through hole 144 of the boss portion 143, the through hole 144 which is interposed between the engagement tabs 145 and 145. Each of the engagement tabs 145 and 145 includes a tab portion 145b formed at a distal end of an extended portion 145a configured in a flat plate shape. A plate thickness of the tab portion 145b is expanded than a plate thickness of the extended portion 145a. In this case, as the second handle member 140 is formed of the resin material, the pair of engagement tabs 145 and 145 is elastically deformable in a direction in which the engagement tabs 145 and 145 come closer to each other and in a direction in which the engagement tabs 145 and 145 are separated from each other. The pair of engagement tabs 145 and 145 serves as "plural engagement tabs" of the present invention. The pair of engagement tabs 145 and 145 may be configured to be arranged to face each other in the vehicle front and rear direction X1, X2. In addition, the number of the engagement tabs 145 provided is not limited to two, and may be increased to more than two, as needed.

The screw 160 is a known metal screw member where the male threaded portion 160a can form a female threaded portion by a screwing action of the screw 160 for itself even though the female threaded portion is not formed in advance at a target of engagement. The screw 160 is inserted into the through hole 144 that is penetratingly formed at the boss portion 143, and is further inserted into the space portion 146 between the engagement tabs 145 and 145 arranged as the pair. Thus, in the present embodiment, an inner wall surface of the through hole 144 and a facing wall surface 145c of each engagement tab 145 correspond to portions at which the female threaded portion is formed by the screwing action of the screw 160. The self-tapping screw 160 serves as "a screw member" and "a stopper member" of the present invention. Instead of the self-taping screw 160, a metal screw member of various types which includes a male threaded portion that is threadedly engageable with a female threaded portion formed in advance at the target of the engagement may be used.

Figure 4:
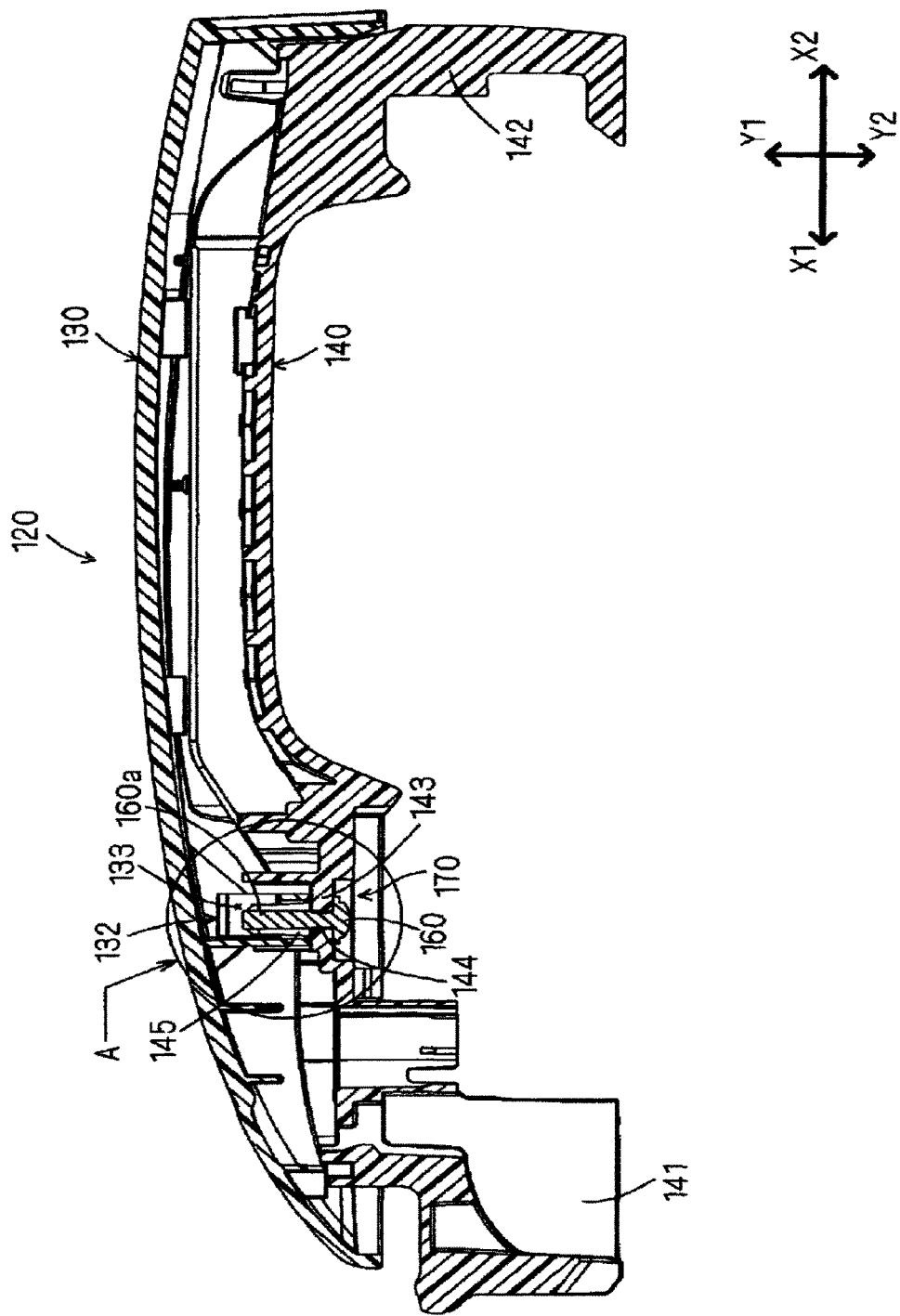
FIG. 4 is a cross-sectional view of the outside handle 120 of FIG. 1.
Figure 5:
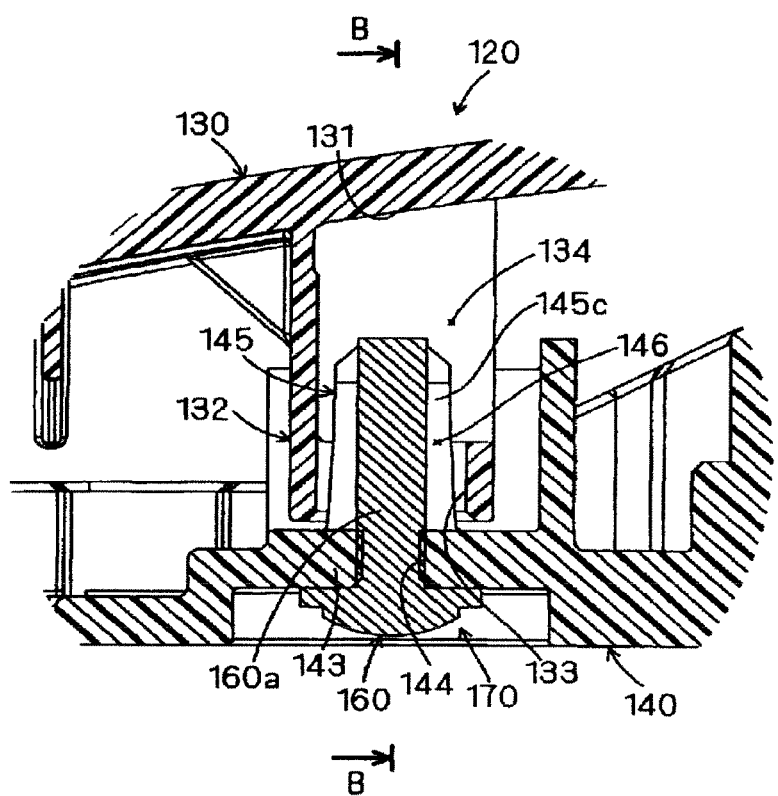
FIG. 5 is an enlarged view of a region A of the outside handle 120 of FIG. 4.

As FIGS. 4 to 6 are referred to, when fixing the first handle member 130 and the second handle member 140 are integrally fixed to each other, first, the pair of engagement tabs 145 and 145 of the second handle member 140 is inserted into the engagement hole 133 formed to open at the pedestal portion 132 of the first handle member 130. In this case, at an inner wall surface of the engagement hole 133 of the pedestal portion 132, an engagement protrusion 135 is provided which protrudes such that the tab portion 145b of each engagement tab 145 is engaged at the engagement protrusion 135 (refer to FIG. 6). Consequently, the pair of engagement tabs 145 and 145 is pushed by the engagement protrusions 135 and 135 in the course of being inserted into the engagement hole 133, and thus is elastically deformed, from the initial state illustrated in FIG. 3, in the direction in which the engagement tabs 145 and 145 come closer to each other. As illustrated in FIG. 6, after the pair of engagement tabs 145 and 145 is inserted in the engagement hole 133 of the pedestal portion 132, a temporarily held state is established, in which the pair of engagement tabs 145 and 145 is held relative to the pedestal portion 132 because the tab portions 145b of the respective engagement tabs 145 are engaged at the respective engagement protrusions 135. In this case, the distal end portions of the pair of engagement tabs 145 and 145, which engages with the engagement hole 133 and thus is in the engaged state, are accommodated in the facing space portion 134 of the pedestal portion 132.

Thereafter, in a state where the pair of engagement tabs 145 and 145 is engaged with the engagement hole 133 of the pedestal portion 132, the screw 160 is screwed into the through hole 144 of the second handle member 140, while being inserted into the through hole 144 of the second handle member 140. Accordingly the male threaded portion 160a of the screw 160 forms the female threaded portion at the inner wall surface of the through hole 144, while coming to threadedly engage with the female threaded portion. Further, once the screw 160 is screwed in, the male threaded portion 160a thereof forms the female threaded portion at the facing wall surface 145c of each engagement tab 145, while coming to threadedly engage with the female threaded portion. As a result, as illustrated in FIG. 7, the screw 160 is screwed to the facing wall surfaces 145c of the respective engagement tabs 145, and is locked at the pair of engagement tabs 145 and 145. Thus, the male threaded portion 160a of the screw 160 is arranged at the space portion 146 interposed between the pair of engagement tabs 145 and 145. Accordingly, the pair of engagement tabs 145 and 145 is restricted from elastically deforming in the direction in which the engagement tabs 145 and 145 come closer to each other (that is, a disengaging direction) by the screw 160, and consequently the engagement of the tab portions 145b of the respective engagement tabs 145 and the engagement hole 133 with each other is maintained. In this case, the male threaded portion 160a of the screw 160 performs a function of restricting the respective engagement tabs 145 engaged with the engagement hole 133 from elastically deforming in the disengaging direction. In consequence, the two handle members 130 and 140 are kept in a fixed state.

As a result of fixing the first handle member 130 and the second handle member 140 to be integral with each other with the use of the fixing mechanism 170, strength similar to a case where a fixing mechanism by fastening of a nut member and a bolt member is used. At the fixing mechanism 170, to fix the two handle members 130 and 140 to each other, simply the screw 160 may be prepared in addition to the two handle members 130 and 140. Thus, the number of parts and components can be reduced compared to a case where a fixing mechanism is employed in which a metal bolt member inserted in an insertion hole of the second handle member 140 is made to threadedly engage with a metal nut member attached to the first handle member 130 by welding and/or insert-molding. In this case, workload for the attachment of the nut member is not necessary. As a result, cost required for the fixing mechanism for fixing the two handle members 130 and 140 can be kept low. In addition, the distal end portions of the pair of engagement tabs 145 and 145 which is accommodated in the facing space portion 134 are protected by the wall surfaces of the pedestal portion 132, and thus a load for disengagement can be prevented from acting on the pair of engagement tabs 145 and 145.

In addition, according to the above-described fixing mechanism 170, the screw 160 is screwed in the second handle member 140 arranged at the vehicle inner side. Accordingly, there is no need to screw the screw 160 into the first handle member 130 arranged at the vehicle outer side, the first handle member 130 which is generally formed of resin material (typically, a polycarbonate system resin material (non-crystalline resin)) that is suitable for paintwork and/or plating. As a result, even in a case where the polycarbonate resin material is used in the first handle member 130, the two handle members 130 and 140 are reliably fixed to each other without concern about a problem, including a crack, for example.

Second Embodiment

Figure 8:
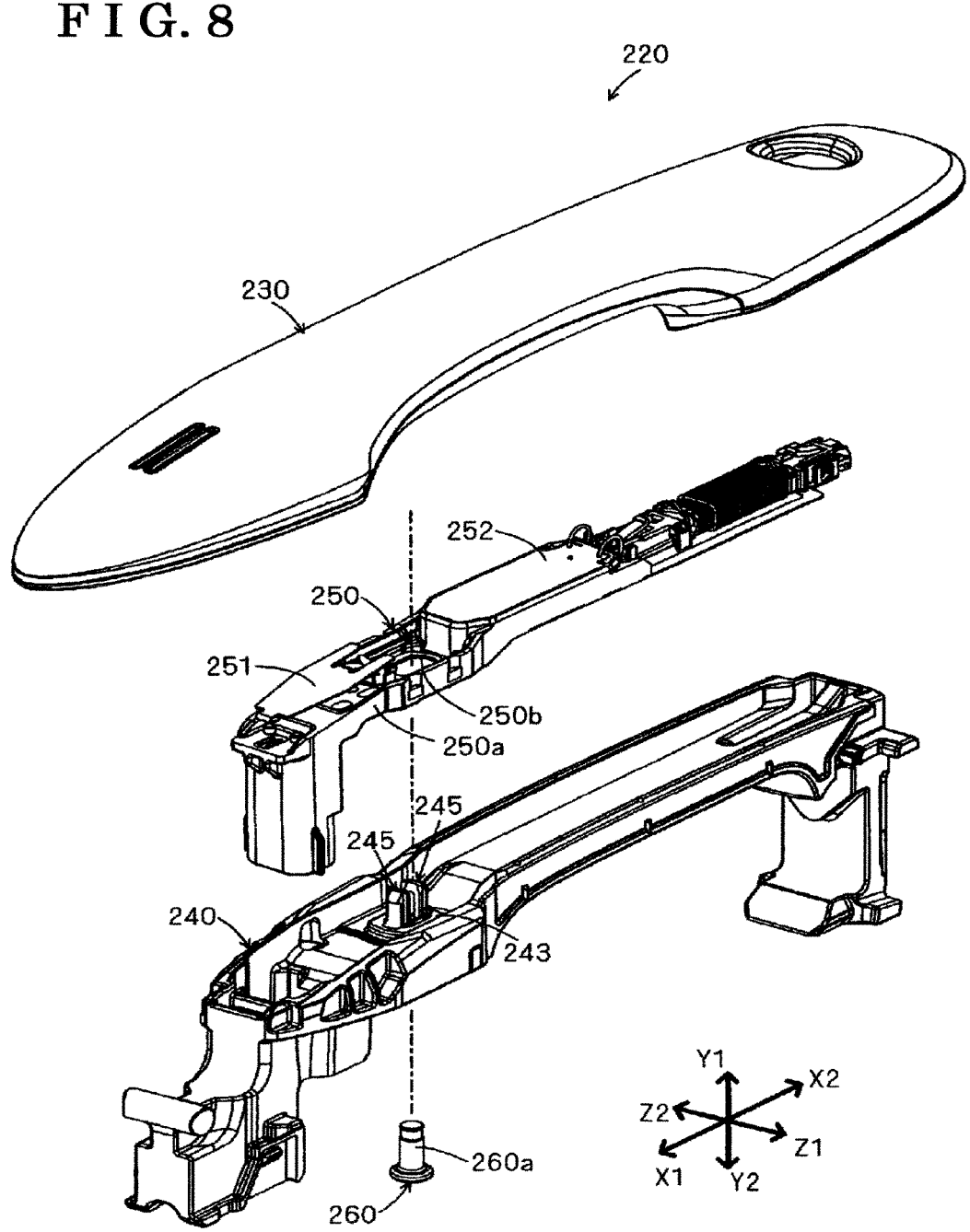
FIG. 8 is an exploded perspective view of an outside handle 220 of a second embodiment.

As illustrated in FIG. 8, a handle 220 of a second embodiment includes a first handle member 230 that is similar to the first handle member 130 and a second handle member 240 that is similar to the second handle member 140. The second handle member 240 includes a pair of engagement tabs 245 and 245 which is similar to the pair of engagement tabs 145 and 145. The first handle member 230 and the second handle member 240 serve as "the first handle member" and "the second handle member" of the present invention, respectively. In addition, the handle 220 includes an antenna unit 250 interposed between the first handle member 230 and the second handle member 240, in addition to the first handle member 230 and the second handle member 240.

The antenna unit 250 includes a known structure and therefore a detailed explanation will be omitted. The antenna unit 250 includes a lock sensor electrode 251 and an antenna assy 252. The lock sensor electrode 251 is a plate-shaped metal member assembled on the first handle member 230, and performs a function of electromagnetically detecting that a hand of the user is in contact with the first handle member 230 on the basis of a change of electrostatic capacity. The lock sensor electrode 251 is connected to an electrode (an antenna assy electrode 252a illustrated in FIG. 13) of the antenna assy 252. The antenna assy 252 performs a function of electromagnetically detecting an operation of the user for opening the handle 220 on the basis of a change of electrostatic capacity. A unit main body 250a, which is made of resin, of the antenna unit 250 includes a through hole 250b formed in a penetrated manner for allowing the pair of engagement tabs 245 and 245 of the second handle member 240 to be inserted in the through hole 250b.

Figure 9:
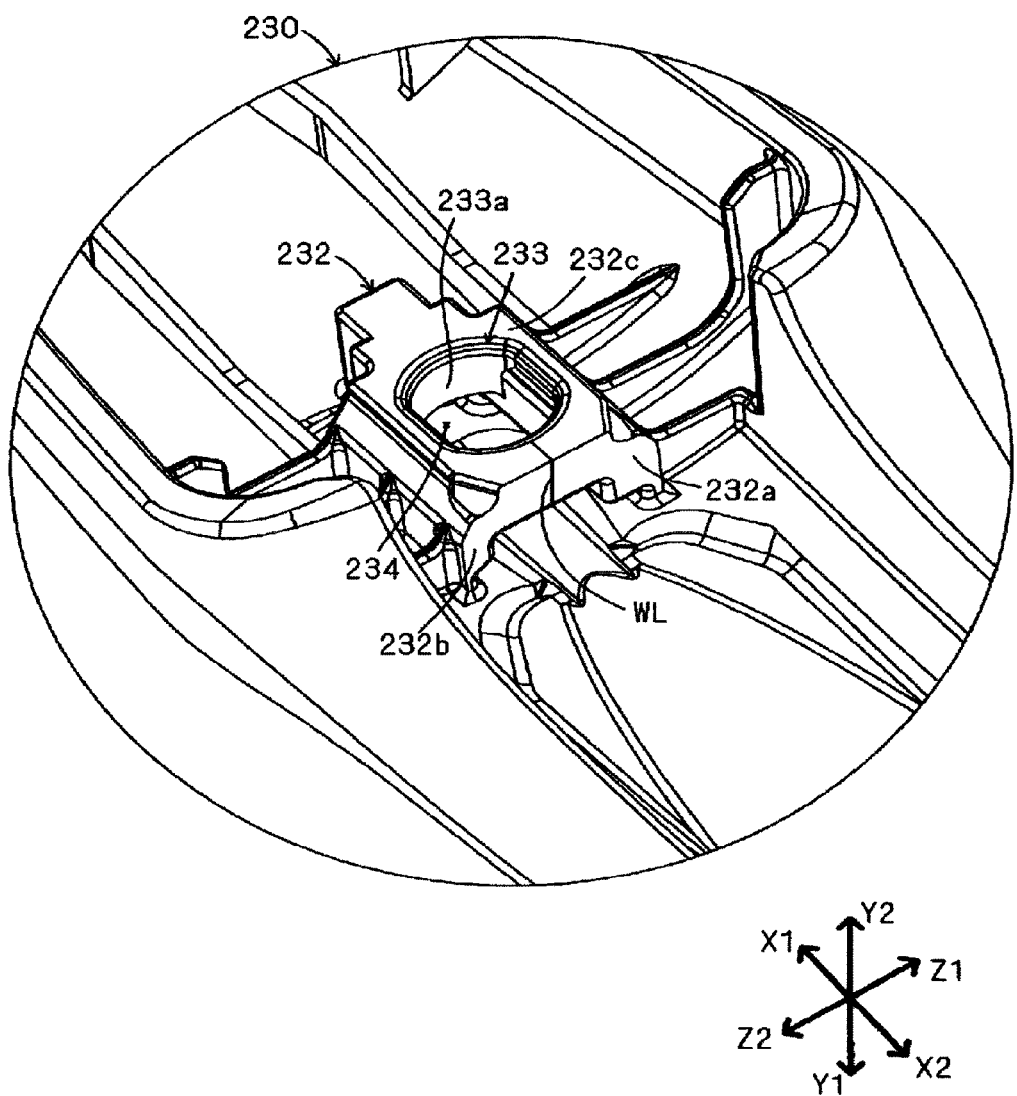
FIG. 9 is a perspective view of a pedestal portion 232 of a first handle member 230 of FIG. 8.

As illustrated in FIG. 9, the first handle member 230 includes a pedestal portion 232 performing a function similar to the pedestal portion 132. The pedestal portion 232 serves as "the pedestal portion" of the present invention. The pedestal portion 232 is formed in a shape of a box at which an engagement hole 233 is formed to open so that the pair of engagement tabs 245 and 245 of at a side of the second handle member 240 is engageable with (insertable into) the engagement hole 233. The pedestal portion 232 serves as "the pedestal portion" of the present invention. In addition, the engagement hole 233 of the pedestal portion 232 corresponds to a portion having a recessed configuration with which the pair of engagement tabs 245 and 245 engages, and serves as "the engagement hole" of the present invention. At each end portion of the engagement hole 233 in the vehicle front and rear direction X1, X2, a curved face 233a is provided. The curved face 233a is formed in a configuration to follow a curved surface (a curved surface 245c in FIG. 12) of each engagement tab 245 inserted in the engagement hole 233. Thus, in a state where the pair of engagement tabs 245 and 245 is inserted in the engagement hole 233, the curved faces 233a of the engagement hole 233 and the curved surfaces of the respective engagement tabs 245 are in surface contact with each other. As a result, the second handle member 240 can be positioned relative to the first handle member 230 easily.

A more concrete explanation will be provided with reference to FIGS. 9 to 11. The pedestal portion 232 includes a pair of standing walls 232a and 232b, and a connection wall 232c. The walls 232a and 232b arranged as the pair are portions of the pedestal portion 232, the portions which are formed to be parallel with each other along the vehicle front and rear direction X1, X2 that corresponds to a direction in which the elongated shape of the handle 220 is extended, and are formed to stand towards the second handle member 240. At the pedestal portion 232, the pair of engagement tabs 245 and 245 engaged at the engagement hole 233 is accommodated in a facing space portion (which will be referred to also as "an accommodation space portion") 234 defined by the pair of standing walls 232a and 232b facing each other. The connection wall 232c is a portion of the pedestal portion 232, the portion which connects the pair of standing walls 232a and 232b to each other and which includes the engagement hole 233 between the pair of standing walls 232a and 232b. The pair of standing walls 232a and 232b, and the connection wall 232c serve as "the pair of standing walls" and "the connection wall" of the present invention, respectively.

It is ideal that the first handle member 230 including the pedestal portion 232 is formed by resin-molding. In this case, in a case where a protruding portion including, for example, a pin and/or a core is provided at a metal mold for the resin-molding so that a hollow portion including, for example, the engagement hole 233, is formed at the pedestal portion 232 of the first handle member 230, molten resin flows in a branched manner at the protruding portion at a time of the resin molding. The divided flows of the molten resin join together again after being branched, and form a thin line (a weld line WL) at a portion at which the molten resin is fused. It is known that the portion at which the weld line WL is formed is weak in adhesion strength, and thus the pedestal portion 232 is easily cracked.

Thus, as FIGS. 10 and 11 are referred to in particular, at the pedestal portion 232, it is ideal that the pair of standing walls 232a and 232b extends along a resin flow direction (the directions indicated by F in FIG. 10) in which the molten resin flows at the time of resin-molding, and that a wall thickness of one standing wall 232a and a wall thickness of the other standing wall 232b differ from each other in a direction (the vehicle upper and lower direction Z1, Z2) intersecting with the resin flow direction F. In the embodiment illustrated in FIGS. 10 and 11, a wall thickness d1 of the one standing wall 232a is configured to exceed a wall thickness d2 of the other standing wall 232b. According to this configuration, a position of the weld line WL can be deviated from an intermediate position of the two standing walls 232a and 232b towards either one of the standing walls in the vehicle upper and lower direction Z1, Z2 by making the wall thickness d1 of the one standing wall 232a and the wall thickness d2 of the other standing wall 232b differ from each other, that is, by making a flow speed of the molten resin flowing at a portion of the metal mold which corresponds to the one standing wall 232a and a flow speed of the molten resin flowing at a portion of the metal mold which corresponds to the other standing wall 232b from each other during the resin-molding. As a result, the weld line WL is formed at a position (a position close to either one of the standing walls) at which the strength is higher than the intermediate portion, and accordingly the pedestal portion 232 is not easily cracked.

Figure 12:
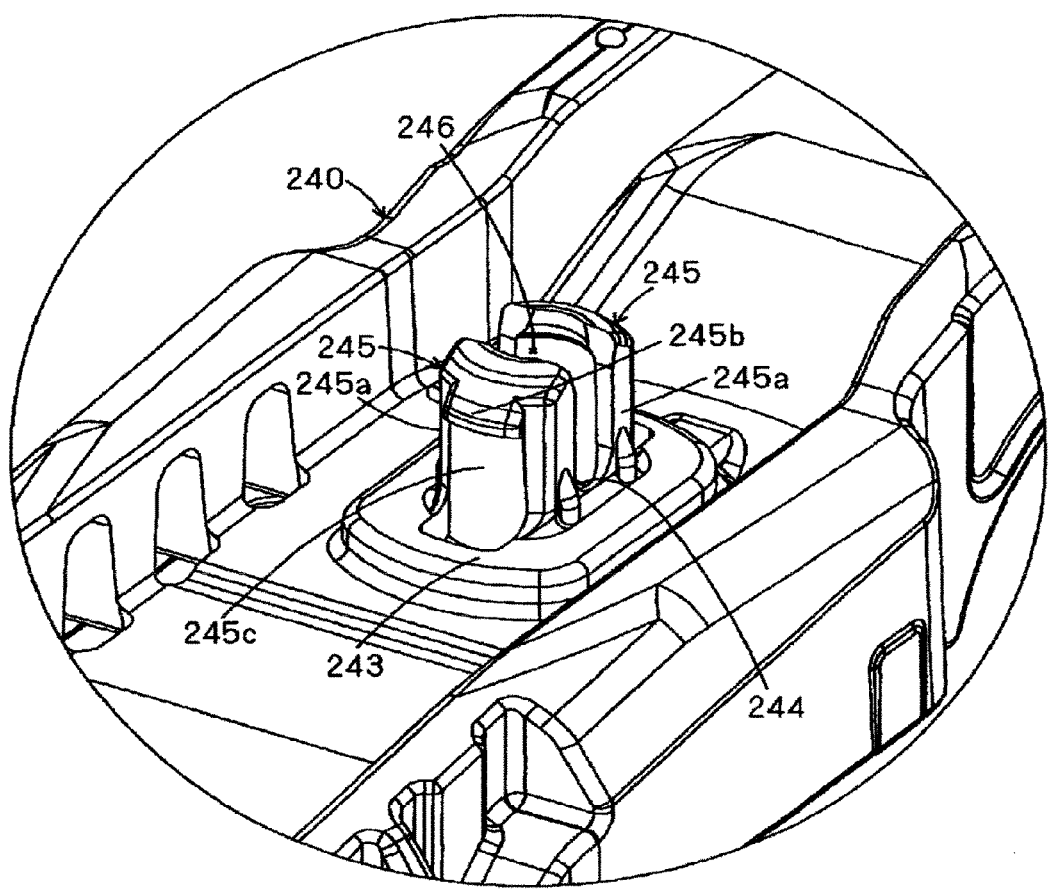
FIG. 12 is a perspective view illustrating a structure of engagement tabs 245 and 245 of a second handle member 240.

As illustrated in FIG. 12, the second handle member 240 includes the engagement tabs 245 and 245 which functioning similarly to the pair of engagement tabs 145 and 145. The engagement tabs 245 and 245 as the pair are arranged to face each other and to be separated from each other in the vehicle front and rear direction X1, X2 by a space portion 246 that is predetermined. A shaft portion 260a of a pin 260 made of resin is insertable into the space portion 246. A through hole 244 of a boss portion 243 is interposed between the pair of engagement tabs 245 and 245, and the pair of engagement tabs 245 and 245 is extended from an edge portion of the through hole 244 towards the vehicle outer direction Y1 to be parallel with each other. Each of the engagement tabs 245 and 245 includes a tab portion 245b formed at a distal end of an extended portion 245a configured in a curved plate shape. A plate thickness of the tab portion 245b is expanded than a plate thickness the extended portion 245a. In this case, as the second handle member 240 is made from a resin material, the pair of engagement tabs 245 and 245 is elastically deformable in a direction in which the engagement tabs 245 and 245 come closer to each other and in a direction in which the engagement tabs 245 and 245 are separated from each other. The pair of engagement tabs 245 and 245 serves as "the plural engagement tabs" of the present invention. The pair of engagement tabs 245 and 245 may be configured to be arranged to face each other in the vehicle upper and lower direction Z1, Z2. In addition, the number of the engagement tabs 245 provided is not limited to two, and may be increased to more than two, as needed.

As illustrated in FIG. 13, at the handle 220 including the above-described configuration, the two members corresponding to the first handle member 230 and the second handle member 240, respectively, are integrally fixed to each other with the use of a fixing mechanism 270. The fixing mechanism 270 corresponds to "the fixing mechanism" of the present invention. The fixing mechanism 270 is configured by the pedestal portion 232 provided at the first handle member 230 in such a manner that the pedestal portion 232 protrudes from an inner wall surface 231 of the first handle member 230 towards the second handle member 240, the pair of engagement tabs 245 and 245 provided to extend from the boss portion 243 of the second handle member 240 towards the pedestal portion 232, and the pin 260 made of resin.

In a case where the first handle member 230 and the second handle member 240 are integrally fixed to each other, first, the antenna unit 250 is assembled on the second handle member 240 in advance in such a manner that the pair of engagement tabs 245 and 245 of the second handle member 240 is inserted into the through hole 250b of the antenna unit 250. Thereafter, the pair of engagement tabs 245 and 245 of the second handle member 240 is inserted into the engagement hole 233 formed to open at the pedestal portion 230 of the first handle member 230. In this case, the tab portions 245b of the respective engagement tabs 245 are engaged at the pedestal portion 232, and accordingly the temporarily held state is established in which the pair of engagement tabs 245 and 245 is held relative to the pedestal portion 232. Thereafter, the pin 260 is inserted into the through hole 244 of the second handle member 240 while the pair of engagement tabs 245 and 245 is in the engaged state in which the pair of engagement tabs 245 and 245 is engaged with the engagement hole 233. Further, the pin 260 is inserted into the space portion 246 between the engagement tabs 245 and 245, and therefore the pin 260 is locked at the pair of engagement tabs 245 and 245. The pin 260 serves as "a pin" and "the stopper member" of the present invention.

Thus, the shaft portion 260a of the pin 260 is arranged in the space portion 246 interposed between the pair of engagement tabs 245 and 245, and the pair of engagement tabs 245 and 245 is restricted from elastically deforming in the direction in which the engagement tabs 245 and 245 come closer to each other (that is, the disengaging direction) by the pin 260, and consequently the engagement of the respective engagement tabs 245 and the engagement hole 233 with each other is maintained. In this case, the shaft portion 260a of the pin 260 performs the function of restricting the respective engagement tabs 245 engaged at the engagement hole 233 from elastically deforming in the disengaging direction. In consequence, the two handle members 230 and 240 are kept in the fixed state. In addition, distal end portions of the pair of engagement tabs 245 and 245 accommodated in the facing space portion 234 are protected by the wall surfaces (the pair of standing walls 232a and 232b) of the pedestal portion 232, and thus the load for disengagement can be prevented from acting on the pair of engagement tabs 245 and 245.

At the handle 220, in the fixed state of the two handle members 230 and 240, both the lock sensor electrode 251 and the antenna assy electrode 252a are configured to be sandwiched by the pedestal portion 232 of the first handle member 230 and the boss portion 243 of the second handle member 240 in a state where the lock sensor electrode 251 and the antenna assy electrode 252a are in contact with each other. That is, the lock sensor electrode 251 that is assembled on the first handle member 230 in advance and the antenna assy electrode 252a that is assembled on the second handle member 240 in advance are in contact with each other. Accordingly, a contact point of the lock sensor electrode 251 and the antenna assy electrode 252a is easily assured simply by fixing the two handle members 230 and 240.

Similarly to a case in which the fixing mechanism 170 is used, also in a case where the fixing mechanism 270 including the above-described configuration is used, in order to fix the two handle members 230 and 240 to each other, simply the pin 260 may be prepared in addition to the two handle members 230 and 240. In this case, because a member corresponding to the nut member is not necessary, the cost of the member itself and/or workload for attaching the member by welding and/or insert-molding do not arise, and accordingly an effect of cost reduction can be obtained. In particular, by using the pin 260 made of resin that is relatively inexpensive, a component cost of the stopper member can be kept low.

The present invention is not limited to the exemplary embodiments described above, and various applications and/or modifications can be considered. For example, each of the following embodiments can be implemented to which the aforementioned embodiments are applied.

At the fixing mechanism 170, 270 of the above-described embodiments, the explanation is made on the case in which the engagement tabs 145, 245, which are extended from the second handle member 140, 240 at the vehicle inner side towards the first handle member 130, 230 at the vehicle outer side, engage with the pedestal portion 132, 232 of the first handle member 130, 230. However, a structure in which the engagement tabs 145, 245 are provided at the first handle member 130, 230 at the vehicle outer side and the pedestal portion 132, 232 is provide at the second handle member 140, 240 at the vehicle inner side may be applied to the present invention.

In the present invention, an essential structure of the door handle apparatus 100 including the above-described configuration may be applied to each vehicle door of a vehicle. For example, the essential structure of the door handle apparatus 100 may be applied to a vehicle right and left door for a front seat and/or a vehicle right and left door for a rear seat, and further to a vehicle rear door (a back door), for example.

The invention claimed is:

1. A door handle apparatus for a vehicle, the door handle apparatus comprising:
   a base frame configured to be provided at a vehicle inner side of a door outer panel configuring an outer surface of a vehicle door;
   an outside handle configured by a first handle member made of resin and a second handle member made of resin which are integrally fixed to each other via a fixing mechanism, the second handle member being at the vehicle inner side relative to the first handle member, the outside handle being configured to be attached to the base frame from a vehicle outer side of the door outer panel;
   the fixing mechanism including a pair of engagement tabs, a pedestal portion and a stopper member;
   the pair of engagement tabs being provided at one handle member that is one of the first handle member and the second handle member;
   the pair of engagement tabs each including a flat plate shape that face each other and are separated from each other by a space portion;
   the pedestal portion being provided at the other handle member that is the other of the first handle member and the second handle member, and including an engagement hole into which each of the of engagement tabs is insertable; and
   the stopper member being inserted in the space portion to contact each of the pair of engagement tabs which is in a state of being inserted in the engagement hole of the pedestal portion, the stopper member preventing disengagement of the air of engagement tabs from the engagement hole.

2. The door handle apparatus for the vehicle according to claim 1, wherein the second handle member is the one handle member and the first handle member is the other handle member, and the stopper member is a screw member made of metal, the screw member is inserted into the space portion by being screwed into the space portion that is formed between the pair of engagement tabs which is in a state of being inserted in the engagement hole of the pedestal portion.

3. The door handle apparatus for the vehicle according to claim 1, wherein the second handle member is the one handle member and the first handle member is the other handle member, and the stopper member is a pin made of resin, the pin is inserted into the space portion that is formed between the air of engagement tabs which is in a state of being inserted in the engagement hole of the pedestal portion.

4. The door handle apparatus for the vehicle according to claim 3, wherein the pedestal portion includes a pair of standing walls formed to be parallel to each other and to stand from the first handle member towards the second handle member, and a connection wall connecting the pair of standing walls to each other and including the engagement hole between the pair of standing walls, and the of engagement tabs which is in a state of being inserted in the engagement hole is accommodated in a facing space portion at which the pair of standing walls face each other.

5. The door handle apparatus for the vehicle according to claim 1, wherein each of the of engagement tabs includes a tab portion expanded in a plate thickness direction, and an inner wall surface of the engagement hole of the pedestal portion includes an engagement protrusion which engages the tab portion of each of the pair of engagement tabs.

\* \* \* \* \*